(12) United States Patent
Nonaka et al.

(10) Patent No.: US 12,484,995 B2
(45) Date of Patent: Dec. 2, 2025

(54) ZIRCONIA MILL BLANK HAVING LAYERS WITH DIFFERENT CONTENTS OF YTTRIA AND ALUMINA

(71) Applicant: SHOFU INC., Kyoto (JP)

(72) Inventors: Kazumichi Nonaka, Kyoto (JP); Shuhei Takahashi, Kyoto (JP); Mitsuji Teramae, Kyoto (JP)

(73) Assignee: SHOFU INC., Kyoto (JP)

( * ) Notice: Subject to any disclaimer, the term of this patent is extended or adjusted under 35 U.S.C. 154(b) by 0 days.

(21) Appl. No.: 17/193,466

(22) Filed: Mar. 5, 2021

(65) Prior Publication Data
US 2021/0401552 A1 Dec. 30, 2021

(30) Foreign Application Priority Data
Mar. 6, 2020 (JP) ................................ 2020-039024

(51) Int. Cl.
*A61C 13/00* (2006.01)
*A61C 13/083* (2006.01)
*B32B 18/00* (2006.01)

(52) U.S. Cl.
CPC ...... *A61C 13/0022* (2013.01); *A61C 13/0004* (2013.01); *A61C 13/083* (2013.01); *B32B 18/00* (2013.01)

(58) Field of Classification Search
None
See application file for complete search history.

(56) References Cited

U.S. PATENT DOCUMENTS

| | | | |
|---|---|---|---|
| 2013/0221554 A1* | 8/2013 | Jung | B32B 18/00 264/16 |
| 2017/0143458 A1 | 5/2017 | Fujisaki et al. | |
| 2017/0151041 A1* | 6/2017 | Goto | A61C 5/30 |
| 2018/0002235 A1 | 1/2018 | Ito et al. | |
| 2019/0099245 A1 | 4/2019 | Rothbrust et al. | |
| 2019/0381769 A1 | 12/2019 | Reinshagen et al. | |
| 2020/0113658 A1* | 4/2020 | Ban | A61K 6/84 |
| 2020/0283341 A1* | 9/2020 | Ushio | C04B 35/63424 |

FOREIGN PATENT DOCUMENTS

| | | | | |
|---|---|---|---|---|
| EP | 3 705 081 | 9/2020 | | |
| JP | 5396691 | 11/2013 | | |
| JP | 5608976 | 9/2014 | | |
| WO | 2015/199018 | 12/2015 | | |
| WO | 2016/104724 | 6/2016 | | |
| WO | WO-2018155459 A1 * | 8/2018 | | A61K 6/84 |

OTHER PUBLICATIONS

Extended European Search Report issued Sep. 10, 2021 in corresponding European Patent Application No. 21160631.4.

* cited by examiner

*Primary Examiner* — Blaine Copenheaver
(74) *Attorney, Agent, or Firm* — Wenderoth, Lind & Ponack, L.L.P.

(57) ABSTRACT

A zirconia mill blank for dental cutting and machining which may impart reproducibility of color tone similar to a natural tooth and high strength to a zirconia perfect sintered body without a special sintering method such as HIP treatment.

The zirconia mill blank for dental cutting and machining comprises at least two intermediate layers LA and LB which satisfy the Formula (1) and Formula (2) defined herein, and change directions of yttria concentration, alumina concentration and contrast ratio in a stacking direction are not changed by the at least two intermediate layers.

6 Claims, No Drawings

ZIRCONIA MILL BLANK HAVING LAYERS WITH DIFFERENT CONTENTS OF YTTRIA AND ALUMINA

CROSS-REFERENCE TO RELATED APPLICATIONS

This application is based on and claims the benefit of priority from Japanese Patent Application Serial No. 2020-039024 (filed on Mar. 6, 2020), the contents of which are hereby incorporated by reference in their entirety.

BACKGROUND OF THE INVENTION

Field of the Invention

The present disclosure relates to a zirconia mill blank for dental cutting and machining.

Description of the Related Art

In recent years, techniques to prepare a prosthesis device by the cutting and machining which uses the dental CAD/CAM system spread rapidly and therefore it has been becoming possible to easily prepare prosthetic devices by cutting and machining blanks which are made of ceramic materials such as zirconia, alumina and lithium disilicate glass, and resin materials such as an acrylic resin and a hybrid resin.

In particular, zirconia has been clinically applied in various cases because of its high strength. On the other hand, the perfect sintered zirconia (hereinafter, also referred to as "zirconia perfect sintered body") has very high hardness and therefore cannot be cut and machined using a dental CAD/CAM system. Thus, a zirconia which is not fully sintered but is calcined at a low firing temperature to adjust to a hardness that enables to cut has been used as a zirconia mill blank for dental cutting and machining.

A general zirconia mill blank for dental cutting and machining is prepared by molding a zirconia powder by press molding or the like and then calcining at 800 to 1200° C.

The properties of the zirconia mill blank for dental cutting and machining, that is, the properties of the zirconia perfect sintered body (fully sintered body) are influenced by the properties of the used zirconia powder.

Japanese Patent No. 5608976 B discloses a zirconia mill blank for dental cutting and machining prepared by using a zirconia powder containing 3 mol % of yttrium with a reduced alumina content, and a zirconia perfect sintered body prepared from the zirconia mill blank. Since the translucency is improved in the perfect sintered body while maintaining high strength, the perfect sintered body is clinically applied in a long span bridge of 4 or more unit, molar part full crown and the like. However, since translucency is insufficient in the perfect sintered body, it has been difficult to apply to the case where high aesthetic property is required such as a front tooth portion.

International Publication No. WO2015/199018 discloses a zirconia blank for dental cutting and machining prepared by using a zirconia powder containing 4 to 6.5 mol % of yttrium, and a zirconia perfect sintered body prepared from the zirconia blank. Since the sintered body has high translucency, the sintered body is clinically applied to the case where high aesthetic property is required such as a front tooth portion. However, the translucency of the perfect sintered body is lower than that of a lithium disilicate material, and therefore it has been difficult to reproduce a color tone of an enamel layer of the natural tooth.

Japanese Patent No. 5396691 discloses a zirconia perfect sintered body using a zirconia powder containing 2 to 7 mol % of yttrium. Since the sintered body has high translucency similar to a porcelain material or a lithium disilicate material, it is applicable to not only the cases of the front tooth but also the cases such as inlay, onlay and veneer. However, since the hot isostatic pressing (HIP) treatment is essential for the sintered body, it has been difficult to manufacture in the general dental laboratory.

International Publication No. WO 2016/104724 discloses a zirconia sintered body having layers with different yttria concentrations and light-shielding agent concentrations. Since the zirconia mill blank includes a layer having high translucency and a layer having low translucency, it is possible to prepare a prosthesis device in which translucency increases from a dental cervical portion to a dental incisal portion, and to reproduce a color tone similar to a natural tooth.

However, since the difference in yttria concentration between layers in the zirconia sintered body is 1 mol % or less, it has been difficult to achieve both strength and translucency because the strength of a dental cervical portion is reduced if the translucency of a dental incisal portion is to be increased, and the translucency of a dental incised portion is reduced if the strength of a dental cervical portion is to be increased.

SUMMARY OF THE INVENTION

Technical Problem

An object of the present disclosure is to provide a zirconia mill blank for dental cutting and machining which may impart reproducibility of color tone similar to a natural tooth and high strength to a zirconia perfect sintered body without a special sintering method such as HIP treatment.

Solution to Problem

The present disclosures made a study on a zirconia mill blank for dental cutting and machining which may impart reproducibility of color tone similar to a natural tooth and high strength to a zirconia perfect sintered body without a special sintering method such as HIP treatment. As a result, the present disclosures have found that it is particularly important to impart two layers having a specific relationship for the yttria concentration and the alumina concentration to the zirconia mill blank for dental cutting and machining for imparting reproducibility of color tone similar to a natural tooth and high strength to a zirconia perfect sintered body. The details of the present disclosure are as follows.

The present disclosure relates to a zirconia mill blank for dental cutting and machining containing yttria and alumina, wherein in a case in which, between two planes which are parallel and face each other, a section in which a distance from one plane of the two planes is within 40% of the distance between the two planes is defined as section A, and a section in which a distance from the other plane is within 40% of the distance between the two planes is defined as section B, layer LA contained in the section A and layer LB contained in the section B satisfy the following Formula (1) and Formula (2), in a case in which, a sintered body prepared by sintering at 1550° C. a test specimen cut out from the layer LA is defined as sintered body SA, a sintered body prepared by sintering at 1550° C. a test specimen cut out from the layer LB is defined as a sintered body SB, a contrast ratio of the sintered body SA at a sample having a thickness of 1 mm is defined as contrast ratio CA and a contrast ratio of the sintered body SB at a sample having a thickness of 1 mm is defined as contrast ratio CB, the contrast ratio CA and the contrast ratio CB satisfy the following Formula (3), the zirconia mill blank for dental cutting and machining comprises at least two intermediate layers between the layer LA and the layer LB, and change directions of yttria concentration, alumina concentration and contrast ratio in a stacking direction are not changed by the at least two intermediate layers.

$$\text{Yttria concentration of layer } LA-\text{Yttria concentration of layer } LB > 1.0 \text{ mol \%} \quad \text{Formula (1):}$$

$$0.0 \text{ wt. \%} < \text{Alumina concentration of layer } LB - \text{Alumina concentration of layer } LA < 0.3 \text{ wt. \%} \quad \text{Formula (2):}$$

$$0.71 \leq (\text{Contrast ratio } CA)/(\text{Contrast ratio } CB) \leq 0.86 \quad \text{Formula (3)}$$

In the present disclosure, it is preferable that all layers contain 3 mol % to 7 mol % of yttria as a stabilizer.

In the present disclosure, it is preferable that the contrast ratio CA is 0.70 or less.

In the present disclosure, it is preferable that the contrast ratio CB is 0.74 or more.

In the present disclosure, it is preferable that both end faces in the stacking direction are composed of parallel planes, and the both end faces compose the two planes which are parallel and face each other.

In the present disclosure, it is preferable that the layer LA and the layer LB are parallel to the two planes which are parallel and face each other.

Advantageous Effects of Invention

The zirconia mill blank for dental cutting and machining of the present disclosure may impart reproducibility of color tone similar to a natural tooth and high strength to a zirconia perfect sintered body.

DETAILED DESCRIPTION OF THE PREFERRED EMBODIMENTS

Hereinafter, specific embodiments of the requirements of the present disclosure will be described in detail.

The feature of the present disclosure is a zirconia mill blank for dental cutting and machining comprising layer A and layer B having a specific relationship for the yttria concentration and the alumina concentration.

Specifically, the zirconia mill blank for dental cutting and machining of the present disclosure contains yttria and alumina, and in a case in which, between two planes which are parallel and face each other, a section in which a distance from one plane of the two planes is within 40% of the distance between the two planes is defined as section A, and a section in which a distance from the other plane is within 40% of the distance between the two planes is defined as section B, contains a layer LA in the section A and a layer LB in the section B.

In the zirconia mill blank for dental cutting and machining of the present disclosure, it is preferable that both end faces in the stacking direction are composed of parallel planes. In this case, the both end faces in the stacking direction compose the two planes which are parallel and face each other. In this case, it is preferable that the layer LA and the layer LB are parallel to the two planes which are parallel and face each other.

Further, when the both end faces in the stacking direction are not composed of parallel planes, the two planes which are parallel and face each other in the present disclosure may be parallel virtual planes at arbitrary positions between the two outermost points in the stacking direction. In this case, it is preferable that the virtual planes are planes containing at least a part of the both end face in each stacking direction. Alternatively, the entire virtual plane may exist in the zirconia mill blank for dental cutting and machining.

The distance between planes in the present disclosure means, in two planes which are parallel and face each other, the distance between the center of gravity of one plane of the two planes and the intersection of a straight line passing through the center of gravity and perpendicular to the one plane and the other plane of the two planes.

In the present disclosure, a layer contained in a section means a part of the layer is contained in the section, preferably means 50% or more of the volume of the layer is contained in the section, and most preferably the entire layer is contained in the section.

In the present disclosure, the yttria concentrations and the alumina concentrations in the layer LA and the layer LB satisfy the following Formula (1) and Formula (2).

The yttria concentration in the layer in the present disclosure means the concentration of all yttrium (and yttrium compounds) contained in the layer in terms of oxides. Further, the alumina concentration in the layer in the present disclosure means the concentration of all aluminum (and aluminum compounds) contained in the layer in terms of oxides.

$$\text{Yttria concentration of layer } LA-\text{Yttria concentration of layer } LB > 1.0 \text{ mol \%} \quad \text{Formula (1):}$$

$$0.0 \text{ wt. \%} < \text{Alumina concentration of layer } LB - \text{Alumina concentration of layer } LA < 0.3 \text{ wt. \%} \quad \text{Formula (2):}$$

Further, it is more preferable to satisfy the following formulas (5) and (6).

$$\text{Yttria concentration of layer } LA - \text{Yttria concentration of layer } LB \geq 2.5 \text{ mol \%} \quad \text{Formula (5):}$$

$$0.08 \text{ wt. \%} < \text{Alumina concentration of layer } LB - \text{Alumina concentration of layer } LA \leq 0.2 \text{ wt. \%} \quad \text{Formula (6):}$$

When "the yttria concentration of the layer LA–the yttria concentration of the layer LB" is 1.0 mol or less, it is not possible to impart sufficient strength to the layer LB that requires high strength since the yttria concentration of the layer LB is inevitably relatively high in the case that the yttria concentration is increased in order to increase the translucency of the layer LA. Further, it is not possible to impart sufficient translucency to the layer LA that requires high translucency since the yttria concentration of the layer LA is inevitably relatively low in the case that the yttria concentration is decreased in order to impart high strength to the layer LB. That is, it is difficult to achieve both strength and translucency.

When the alumina concentration of the layer LA is equal to or higher than the alumina concentration of the layer LB, the change of translucency in the zirconia sintered body becomes too small, and it is difficult to impart reproducibility of color tone similar to a natural tooth to the zirconia sintered body. Further, when "the alumina concentration of the layer LB–the alumina concentration of the layer LA"≥0.3 wt. %, the change of translucency in the zirconia sintered body becomes too large, and it is difficult to impart reproducibility of color tone similar to a natural tooth to the zirconia sintered body.

Further, in the zirconia mill blank for dental cutting and machining of the present disclosure, in a case in which, a sintered body prepared by sintering at 1550° C. a test specimen cut out from the layer LA (specifically, firing temperature: 1550° C., holding period: 2 hr, temperature increase rate: 5° C./minute,) is defined as sintered body SA, a sintered body prepared by sintering at 1550° C. a test specimen cut out from the layer LB (specifically, firing temperature: 1550° C., holding period: 2 hr, temperature increase rate: 5° C./minute,) is defined as sintered body SB, a contrast ratio of the sintered body SA at a sample having a thickness of 1 mm is defined as contrast ratio CA and a contrast ratio of the sintered body SB at a sample having a thickness of 1 mm is defined as contrast ratio CB, it is preferable to satisfy the following Formula (3).

$$0.71 \leq (\text{Contrast ratio } CA)/(\text{Contrast ratio } CB) \leq 0.86 \quad \text{Formula (3):}$$

Further, it is more preferable to satisfy the following formula (6).

$$0.76 \leq (\text{Contrast ratio } CA)/(\text{Contrast ratio } CB) \leq 0.83 \quad \text{Formula (6):}$$

When "(Contrast ratio CA)/(Contrast ratio CB)" is less than 0.71, it is not preferable because the change of translucency in the zirconia sintered body may become too large and reproducibility of color tone similar to a natural tooth may not be obtained. Further, when "(Contrast ratio CA)/(Contrast ratio CB)" is larger than 0.86, it is not preferable because the change of translucency in the zirconia sintered body may become too small and reproducibility of color tone similar to a natural tooth may not be obtained. Furthermore, when the thickness of the layer LA and the layer LB are not sufficient for preparing the test specimen having a thickness of 1 mm, the test specimen may be prepared from a zirconia mill blank for dental cutting and machining having the same composition and a sufficient thickness.

The zirconia mill blank for dental cutting and machining of the present disclosure comprises at least two, preferably three or more intermediate layers between the layer LA and the layer LB and change directions of yttria concentration, alumina concentration and contrast ratio in a stacking direction are not changed by the at least two intermediate layers. When the number of the intermediate layer is 1 or less, the translucency and the color tone may change rapidly, and the aesthetic property may be impaired.

In the zirconia mill blank for dental cutting and machining of the present disclosure, all layers contain preferably 3 mol % to 7 mol %, more preferably 3.5 mol % to 6.5 mol % of yttria as a stabilizer. When the yttria content is less than 3.0 mol %, it is not preferable because the translucency of the zirconia sintered body becomes too low. When the yttria content is higher than 7.0 mol %, it is not preferable because although the translucency becomes high, the strength becomes low. Further, the zirconia mill blank for dental cutting and machining of the present disclosure may contain 3 mol % to 7 mol % yttria as a stabilizer in any of the layers from the layer LA to the layer LB.

The zirconia mill blank for dental cutting and machining of the present disclosure may contain yttrium compound which is not solid-solved. Specifically, it is preferable that the yttrium compound used in the present disclosure is preferably a water-soluble compound consisting of any one of a halogen compound, a nitrate, a sulfate and an organic acid salt of yttrium oxide and/or yttrium. Specific examples of the water-soluble yttrium compound include yttrium chloride, yttrium nitrate, yttrium acetate, yttrium carboxylate, yttrium sulfate and yttrium carbonate.

Among water-soluble yttrium compounds, an yttrium compound of an organic acid is particularly preferable from the viewpoint of low decomposition temperature and suppressing the contamination of the firing furnace and the like. Specific examples include yttrium acetate and yttrium carbonate. The decomposition temperature of organic acid salt is lower than that of inorganic salt such as halogen compound, nitrate and sulfate, and the organic acid salt decomposes at low temperature in comparison with the inorganic salt. When the decomposition temperature is high, it may be difficult to impart sufficient translucency and strength to the zirconia perfect sintered body because a pore remains in sintering process.

In the present disclosure, the contrast ratio CA is preferably 0.70 or less, and more preferably 0.68 or less. When the contrast ratio CA is larger than 0.70, it is not preferable because the translucency of the zirconia sintered body is low and it is difficult to reproduce an enamel layer of a natural tooth.

The alumina concentration of the zirconia mill blank for dental cutting and machining of the present disclosure is preferably 0.01 wt. % or more. When the amount of alumina is lower than 0.01 wt. %, there is a tendency that the zirconia perfect sintered body may not be sufficiently sintered and therefore sufficient strength and translucency may not be imparted.

In the present disclosure, the contrast ratio CB is preferably 0.74 or more, and more preferably 0.80 or more. When the contrast ratio CB is less than 0.74, it is not preferable because the translucency of the zirconia sintered body is high and it is difficult to reproduce a cervical portion of a natural tooth.

As the zirconia powder used for preparing the zirconia mill blank for dental cutting and machining of the present disclosure, any zirconia powder prepared from any known zirconia powder may be used without any limitations. Specifically, it is preferable that zirconia powder used for preparing the zirconia mill blank for dental cutting and machining of the present disclosure is prepared by a hydrolysis method. More specifically, the zirconia powder is prepared by a method which comprises heating a solution in which a zirconium salt and a yttrium compound are mixed and dissolved to cause a hydrolysis reaction, drying and firing the generated sol to prepare a zirconia powder, and pulverizing and granulating the powder. Further, by mixing an aluminum compound before this pulverization step, an alumina-containing zirconia powder is prepared.

It is preferable that a primary particle diameter of zirconia powder used for preparing the zirconia mill blank for dental cutting and machining of the present disclosure is within a range of 1 to 500 nm. When the primary particle diameter is less than 1 nm, there is a tendency that it is difficult to impart sufficient strength, although the translucency of the zirconia sintered body is improved. On the other hand, when the primary particle diameter is more than 500 nm, there is a tendency that it may be difficult to impart sufficient strength to the zirconia sintered body.

It is preferable that the zirconia mill blank for dental cutting and machining of the present disclosure contains a coloring material. Specific examples thereof include iron oxide for imparting a yellow color and erbium for imparting a red color. In addition, there is no problem at all even if other colored zirconia powder which contains element such as cobalt, manganese and chrome for adjusting a color in addition to these colored material is used together. In the present disclosure, it is easy to color to the tooth color by including the coloring material.

It is preferable that the relative density of the zirconia sintered body prepared by sintering the zirconia mill blank for dental cutting and machining of the present disclosure at 1550° C. is 98% or more of the theoretical density. The relative density is determined by the measured density/the theoretical density. When the relative density is less than 98%, the strength and translucency tend to be lowered.

It is preferable that a crystal phase of the zirconia mill blank for dental cutting and machining of the present disclosure is tetragonal and/or cubic. When the crystal phase is monoclinic phase, it is not preferable because sufficient translucency may be not imparted after perfect sintering of zirconia.

The preparing method of the zirconia mill blank for dental cutting and machining of the present disclosure is not particularly limited, and any known preparing methods can be used without any problem. Specifically, it is preferable to be prepared by molding a zirconia powder by a press molding. Furthermore, it is more preferable to be prepared by a multilayer molding in which zirconia powders having different color tones or compositions are press-molded in multiple stages.

The zirconia mill blank for dental cutting and machining of the present disclosure is preferably subjected to isostatic pressing by cold isostatic pressing (CIP treatment) after the press molding.

The maximum load pressure of CIP treatment in the present disclosure is preferably 50 Mpa or more. When the maximum load pressure is less than 50 MPa, there is a case where sufficient translucency and strength may be not imparted to the zirconia sintered body.

The holding time at the maximum load pressure of the CIP treatment of the present disclosure is not particularly limited, but in general, a range of 0 to 150 seconds is preferable and a range of 0 to 60 seconds is more preferable.

The time period required for the above series of processes is not particularly limited, but is usually preferably within a range of 30 seconds to 10 minutes and is more preferably within a range of 3 minutes to 7 minutes. When the time is too short, a molding body may be destroyed, and when the time is too long, production efficiency worsens, and therefore these are not preferable.

A calcination temperature of the zirconia mill blank for dental cutting and machining of the present disclosure is preferably within a range of 800 to 1200° C. When the calcination temperature is less than 800° C., because Vickers hardness and/or bending strength become too low and therefore there is a tendency that chipping and breakage easily occur in the cutting and machining. On the other hand, when the calcination temperature is more than 1200° C., because Vickers hardness and/or bending strength become too high and therefore there is a tendency that a milling bar of a milling machine is heavily consumed to raise a running cost.

The zirconia mill blank for dental cutting and machining of the present disclosure can be prepared by the above-described preparing method. The prepared zirconia mill blank for dental cutting and machining is severed, cut, and polished so as to have a desired size as necessary.

The method for perfect sintering the zirconia mill blank for dental cutting and machining of the present disclosure is not particularly limited, but a simple and preferred method is to firing at normal pressure. The firing temperature is not particularly limited, but is preferably within a range of 1450 to 1600° C., particular preferably within a range of 1500 to 1600° C. The holding time at the firing temperature is not particularly limited, but is preferably within a range of 1 minute to 12 hours, and particular preferably within a range of 2 to 4 hours. The temperature increase rate is not particularly limited, but is preferably within a range of 1 to 400° C./min, and more preferably within a range of 3 to 100° C./h.

The kind of a prosthesis device prepared by cutting and machining the zirconia mill blank for dental cutting and machining according to the present disclosure is not limited particularly, and there is no problem at all even if the prosthesis device is any of an inlay, an onlay, a veneer, a crown, a bridge and the like. Therefore, a shape of a zirconia mill blank for dental cutting and machining which is cut and machined for preparing a prosthesis device is not limited particularly, and any zirconia mill blank for dental cutting and machining can be used even if the zirconia mill blank for dental cutting and machining has any shape such as a block shape corresponding to an inlay, an onlay, a veneer, a crown and the like and a disk shape corresponding to a bridge.

EXAMPLES

Hereinafter, the present disclosure is described by way of Examples in more detail, and specifically, but the present disclosure is not limited to these Examples.

Table 1 shows the yttria content, alumina content and iron oxide content in the used zirconia powder.

TABLE 1

| Sample name | ZR1 | ZR2 | ZR3 | ZR4 | ZR5 |
|---|---|---|---|---|---|
| Yttria Content (mol %) | 7.0 | 6.5 | 6.0 | 5.5 | 4.0 |
| Alumina Content (wt %) | 0.05 | 0.05 | 0.05 | 0.05 | 0.05 |
| Iron oxide Contnent (wt %) | 0.05 | 0.05 | 0.05 | 0.05 | 0.05 |
| Sample name | ZR6 | ZR7 | ZR8 | ZR9 | ZR10 |
| Yttria Content (mol %) | 3.5 | 3.5 | 3.0 | 4.0 | 4.0 |
| Alumina Content (wt %) | 0.05 | 0.40 | 0.40 | 0.34 | 0.25 |
| Iron oxide Contnent (wt %) | 0.13 | 0.13 | 0.13 | 0.13 | 0.13 |
| Sample name | ZR11 | ZR12 | ZR13 | ZR14 | ZR15 |
| Yttria Content (mol %) | 3.5 | 3.0 | 3.0 | 4.4 | 4.0 |
| Alumina Content (wt %) | 0.25 | 0.25 | 0.14 | 0.25 | 0.55 |
| Iron oxide Contnent (wt %) | 0.13 | 0.13 | 0.13 | 0.13 | 0.13 |

| Sample name | ZR16 |
|---|---|
| Yttria Content (mol %) | 5.0 |
| Alumina Content (wt %) | 0.05 |
| Iron oxide Contnent (wt %) | 0.05 |

[Preparation of Zirconia Powder Forming Intermediate Layer]

For each example, zirconia powders forming intermediate layers were prepared by mixing a zirconia powder forming the first layer and a zirconia powder forming the fifth layer as shown below.

TABLE 2

| | Compound ratio (wt %) | | | | |
|---|---|---|---|---|---|
| | Intermediate layer 1 | Intermediate layer 2 | Intermediate layer 3 | Intermediate layer 4 | Intermediate layer 5 |
| Zirconia powder forming first layer | 75 | 50 | 25 | 67 | 33 |

TABLE 2-continued

| | Compound ratio (wt %) | | | | |
|---|---|---|---|---|---|
| | Intermediate layer 1 | Intermediate layer 2 | Intermediate layer 3 | Intermediate layer 4 | Intermediate layer 5 |
| Zirconia powder forming fifth layer | 25 | 50 | 75 | 33 | 67 |

[Preparation of Zirconia Mill Blank]

A predetermined amount of the powder forming the first layer was filled in a mold (φ100 mm), and the upper surface was scraped and flattened. Then, the powder forming the second layer was filled on the powder forming the first layer, and the upper surface was scraped and flattened. After repeating this operation until the n-th layer was formed, press molding (surface pressure: 50 MPa) was performed to obtain a molded body in which the n-th layers of zirconia powders were stacked (overall thickness: 14.5 mm, the first layer thickness: 4.3 mm, the n-th layer thickness: 5.1 mm, each intermediate layer thickness=(5.1 mm/the number of intermediate layers)). Further, the molded body was subjected to CIP treatment (maximum load pressure: 200 MPa, load pressure after releasing: 0 MPa, holding time: 1 minute). Thereafter, calcination was performed in an electric furnace (1000° C., 30 minutes) to prepare a zirconia temporarily sintered body.

[Evaluation of Yttrium Amount]

The test specimen for evaluating the yttrium amount was prepared by cutting and machining each zirconia mill blank into a round plate shape 414 mm×1.6 mm). A molar fraction of yttrium in terms of oxide (yttrium oxide) contained in each test specimen was measured by using a fluorescent X-ray apparatus (manufactured by Rigaku Corporation).

[Evaluation of Alumina Amount]

The test specimen for evaluating the alumina amount was prepared by cutting and machining each zirconia mill blank into a round plate shape 414 mm×1.6 mm). A weight fraction of alumina contained in each test specimen was measured by using a fluorescent X-ray apparatus (manufactured by Rigaku Corporation).

[Evaluation of Translucency]

The test specimen for evaluating the translucency was prepared by cutting and machining the zirconia mill blank for dental cutting and machining into a round plate shape (φ14 mm×1.6 mm). Each test specimen was perfect sintered (firing temperature: 1550° C., temperature increase rate: 5 minutes/5° C., holding time: 2 hours) in a firing furnace. Then, the thickness (1.0 mm) of each test body was adjusted with a surface grinder. The translucency was evaluated by measuring the contrast ratio. The contrast ratio was measured by using a spectrocolorimeter (manufactured by Konica Minolta). In the following formula, Yw is the value Y measured by placing the white plate under the test specimen, and Yb is the value Y measured by placing the black plate under the test specimen. The contrast ratio was calculated from the following formula.

When the contrast ratio value is close to zero, the materials are transparency. When the contrast ratio value is close to 1, the materials are opaqueness.

Formula: The contrast ratio=$Yb/Yw$

[Evaluation of Aesthetic Property]

Each zirconia mill blank for dental cutting and machining was formed into a maxillary central incisor shape on left side by using a milling machine (DWX51D, manufactured by Roland Corporation). Thereafter, a crown test specimen was prepared by firing at 1550° C. for 2 hours by using a zirconia sintering furnace (Esthemat Sinta, manufactured by Shofu INC.). The aesthetic property of the crown specimen was visually evaluated as follows.

AA: Sufficiently applicable to cases where high aesthetic property is required

A: Applicable to cases where high aesthetic property is required

B: Not suitable for cases where high aesthetic property is required

C: Not applicable to cases where high aesthetic property is required

Table 3 and Table 4 show the results of characteristic tests of the prepared zirconia mill blank for dental cutting and machining in Examples and Comparative Examples.

TABLE 3

| | | Example 1 | Example 2 | Example 3 | Example 4 | Example 5 | Example 6 |
|---|---|---|---|---|---|---|---|
| Zirconia mill blank for dental cutting and machining | Number of layer n | 5 | 5 | 5 | 5 | 5 | 5 |
| | Zirconia powder of first layer | ZR3 | ZR3 | ZR1 | ZR3 | ZR3 | ZR4 |
| | Zirconia powder of n-3 layer | Intermediate layer 1 | Intermediate layer 1 | Intermediate layer 1 | Intermediate layer 1 | Intermediate layer 1 | Intermediate layer 1 |
| | Zirconia powder of n-2 layer | Intermediate layer 2 | Intermediate layer 2 | Intermediate layer 2 | Intermediate layer 2 | Intermediate layer 2 | Intermediate layer 2 |
| | Zirconia powder of n-1 layer | Intermediate layer 3 | Intermediate layer 3 | Intermediate layer 3 | Intermediate layer 3 | Intermediate layer 3 | Intermediate layer 3 |
| | Zirconia powder of n layer | ZR11 | ZR13 | ZR11 | ZR12 | ZR10 | ZR11 |
| | Yttrium content of first layer (mol %: Y2O3) | 6.0 | 6.0 | 7.0 | 6.0 | 6.0 | 5.5 |
| | Yttrium content of n-3 layer (mol %: Y2O3) | 5.4 | 5.3 | 6.1 | 5.3 | 5.5 | 5.0 |
| | Yttrium content of n-2 layer (mol %: Y2O3) | 4.8 | 4.5 | 5.3 | 4.5 | 5.0 | 4.5 |
| | Yttrium content of n-1 layer (mol %: Y2O3) | 4.1 | 3.8 | 4.4 | 3.8 | 4.5 | 4.0 |
| | Yttrium content of n layer (mol %: Y2O3) | 3.5 | 3.0 | 3.5 | 3.0 | 4.0 | 3.5 |
| | Alumina content of first layer (wt %) | 0.05 | 0.05 | 0.05 | 0.05 | 0.05 | 0.05 |
| | Alumina content of n-3 layer (wt %) | 0.10 | 0.07 | 0.10 | 0.10 | 0.10 | 0.10 |

TABLE 3-continued

|  |  | | | | | | |
|---|---|---|---|---|---|---|---|
|  | Alumina content of n-2 layer (wt %) | 0.15 | 0.10 | 0.15 | 0.15 | 0.15 | 0.15 |
|  | Alumina content of n-1 layer (wt %) | 0.20 | 0.12 | 0.20 | 0.20 | 0.20 | 0.20 |
|  | Alumina content of n layer (wt %) | 0.25 | 0.14 | 0.25 | 0.25 | 0.25 | 0.25 |
|  | Yttria concentration of layer LA-Yttria concentration of layer LB | 2.5 | 3.0 | 3.5 | 3.0 | 2.0 | 2.0 |
|  | Alumina concentration of layer LA-Alumina concentration of layer LB | −0.20 | −0.09 | −0.20 | −0.20 | −0.20 | −0.20 |
| Fully sintered body | Firing temperature (° C.) | 1550 | 1550 | 1550 | 1550 | 1550 | 1550 |
|  | Contrast ratio of first layer | 0.67 | 0.67 | 0.63 | 0.67 | 0.67 | 0.69 |
|  | Contrast ratio of n-3 layer | 0.75 | 0.75 | 0.71 | 0.76 | 0.74 | 0.76 |
|  | Contrast ratio of n-2 layer | 0.78 | 0.78 | 0.76 | 0.80 | 0.77 | 0.78 |
|  | Contrast ratio of n-1 layer | 0.78 | 0.79 | 0.76 | 0.82 | 0.78 | 0.79 |
|  | Contrast ratio of n-th layer | 0.82 | 0.84 | 0.82 | 0.86 | 0.80 | 0.82 |
|  | Contrast ratio A/Contrast ratio B | 0.82 | 0.80 | 0.77 | 0.78 | 0.84 | 0.84 |
|  | Number of the intermediate layer | 3 | 3 | 3 | 3 | 3 | 3 |
|  | Aesthetic property | AA | AA | A | AA | A | A |

| | | Example 7 | Example 8 | Example 9 | Example 10 |
|---|---|---|---|---|---|
| | Number of layer n | 5 | 5 | 4 | 5 |
| Zirconia mill blank for dental cutting and machining | Zirconia powder of first layer | ZR2 | ZR4 | ZR3 | ZR2 |
| | Zirconia powder of n-3 layer | Intermediate layer 1 | Intermediate layer 1 | — | Intermediate layer 1 |
| | Zirconia powder of n-2 layer | Intermediate layer 2 | Intermediate layer 2 | Intermediate layer 4 | Intermediate layer 2 |
| | Zirconia powder of n-1 layer | Intermediate layer 3 | Intermediate layer 3 | Intermediate layer 5 | Intermediate layer 3 |
| | Zirconia powder of n layer | ZR11 | ZR9 | ZR11 | ZR12 |
| | Yttrium content of first layer (mol %: Y2O3) | 6.5 | 5.5 | 6.0 | 6.5 |
| | Yttrium content of n-3 layer (mol %: Y2O3) | 5.8 | 5.1 | — | 5.6 |
| | Yttrium content of n-2 layer (mol %: Y2O3) | 5.0 | 4.8 | 5.2 | 4.8 |
| | Yttrium content of n-1 layer (mol %: Y2O3) | 4.3 | 4.4 | 4.3 | 3.9 |
| | Yttrium content of n layer (mol %: Y2O3) | 3.5 | 4.0 | 3.5 | 3.0 |
| | Alumina content of first layer (wt %) | 0.05 | 0.05 | 0.05 | 0.05 |
| | Alumina content of n-3 layer (wt %) | 0.10 | 0.13 | — | 0.10 |
| | Alumina content of n-2 layer (wt %) | 0.15 | 0.20 | 0.12 | 0.15 |
| | Alumina content of n-1 layer (wt %) | 0.20 | 0.28 | 0.20 | 0.20 |
| | Alumina content of n layer (wt %) | 0.25 | 0.35 | 0.25 | 0.25 |
| | Yttria concentration of layer LA-Yttria concentration of layer LB | 3.0 | 1.5 | 2.5 | 3.5 |
| | Alumina concentration of layer LA-Alumina concentration of layer LB | −0.20 | −0.30 | −0.20 | −0.20 |
| Fully sintered body | Firing temperature (° C.) | 1550 | 1550 | 1550 | 1550 |
| | Contrast ratio of first layer | 0.64 | 0.69 | 0.67 | 0.64 |
| | Contrast ratio of n-3 layer | 0.72 | 0.75 | — | 0.73 |
| | Contrast ratio of n-2 layer | 0.77 | 0.78 | 0.76 | 0.78 |
| | Contrast ratio of n-1 layer | 0.78 | 0.79 | 0.78 | 0.81 |
| | Contrast ratio of n-th layer | 0.82 | 0.83 | 0.82 | 0.86 |
| | Contrast ratio A/Contrast ratio B | 0.79 | 0.83 | 0.82 | 0.74 |
| | Number of the intermediate layer | 3 | 3 | 2 | 3 |
| | Aesthetic property | AA | A | A | A |

TABLE 4

| | | Example 11 | Example 12 | Example 13 | Comparative Example 1 | Comparative Example 2 |
|---|---|---|---|---|---|---|
| | Number of layer n | 5 | 5 | 5 | 5 | 5 |
| Zirconia mill blank for dental cutting and machining | Zirconia powder of first layer | ZR4 | ZR3 | ZR16 | ZR3 | ZR2 |
| | Zirconia powder of n-3 layer | Intermediate layer 1 | Intermediate layer 1 | Intermediate layer 1 | Intermediate layer 1 | Intermediate layer 1 |
| | Zirconia powder of n-2 layer | Intermediate layer 2 | Intermediate layer 2 | Intermediate layer 2 | Intermediate layer 2 | Intermediate layer 2 |

TABLE 4-continued

|  |  | | | | | |
|---|---|---|---|---|---|---|
|  | Zirconia powder of n-1 layer | Intermediate layer 3 | Intermediate layer 3 | Intermediate layer 3 | Intermediate layer 3 | Intermediate layer 3 |
|  | Zirconia powder of n layer | ZR14 | ZR15 | ZR13 | ZR6 | ZR8 |
|  | Yttrium content of first layer (mol %: Y2O3) | 5.5 | 6.0 | 5.0 | 6.0 | 6.5 |
|  | Yttrium content of n-3 layer (mol %: Y2O3) | 5.2 | 5.5 | 4.5 | 5.4 | 5.6 |
|  | Yttrium content of n-2 layer (mol %: Y2O3) | 5.0 | 5.0 | 4.0 | 4.8 | 4.8 |
|  | Yttrium content of n-1 layer (mol %: Y2O3) | 4.7 | 4.5 | 3.5 | 4.1 | 3.9 |
|  | Yttrium content of n layer (mol %: Y2O3) | 4.4 | 4.0 | 3.0 | 3.5 | 3.0 |
|  | Alumina content of first layer (wt %) | 0.05 | 0.05 | 0.05 | 0.05 | 0.05 |
|  | Alumina content of n-3 layer (wt %) | 0.10 | 0.18 | 0.07 | 0.05 | 0.14 |
|  | Alumina content of n-2 layer (wt %) | 0.15 | 0.30 | 0.10 | 0.05 | 0.23 |
|  | Alumina content of n-1 layer (wt %) | 0.20 | 0.43 | 0.12 | 0.05 | 0.31 |
|  | Alumina content of n layer (wt %) | 0.25 | 0.55 | 0.14 | 0.05 | 0.40 |
|  | Yttria concentration of layer LA-Yttria concentration of layer LB | 1.1 | 2.0 | 2.0 | 2.5 | 3.5 |
|  | Alumina concentration of layer LA-Alumina concentration of layer LB | −0.30 | −0.50 | −0.09 | 0.00 | −0.35 |
| Fully sintered body | Firing temperature (° C.) | 1550 | 1550 | 1550 | 1550 | 1550 |
|  | Contrast ratio of first layer | 0.69 | 0.67 | 0.71 | 0.67 | 0.64 |
|  | Contrast ratio of n-3 layer | 0.74 | 0.75 | 0.76 | 0.71 | 0.74 |
|  | Contrast ratio of n-2 layer | 0.78 | 0.80 | 0.77 | 0.74 | 0.79 |
|  | Contrast ratio of n-1 layer | 0.79 | 0.82 | 0.79 | 0.75 | 0.85 |
|  | Contrast ratio of n-th layer | 0.81 | 0.89 | 0.84 | 0.77 | 0.91 |
|  | Contrast ratio A/Contrast ratio B | 0.85 | 0.75 | 0.85 | 0.87 | 0.70 |
|  | Number of the intermediate layer | 3 | 3 | 3 | 3 | 3 |
|  | Aesthetic property | A | A | A | B | B |

|  |  | Comparative Example 3 | Comparative Example 4 | Comparative Example 5 | Comparative Example 6 |
|---|---|---|---|---|---|
|  | Number of layer n | 5 | 5 | 3 | 2 |
| Zirconia mill blank for dental cutting and machining | Zirconia powder of first layer | ZR5 | ZR3 | ZR3 | ZR3 |
|  | Zirconia powder of n-3 layer | Intermediate layer 1 | Intermediate layer 1 | — | — |
|  | Zirconia powder of n-2 layer | Intermediate layer 2 | Intermediate layer 2 | — | — |
|  | Zirconia powder of n-1 layer | Intermediate layer 3 | Intermediate layer 3 | Intermediate layer 2 | — |
|  | Zirconia powder of n layer | ZR12 | ZR7 | ZR11 | ZR11 |
|  | Yttrium content of first layer (mol %: Y2O3) | 4.0 | 6.0 | 6.0 | 6.0 |
|  | Yttrium content of n-3 layer (mol %: Y2O3) | 3.8 | 5.4 | — | — |
|  | Yttrium content of n-2 layer (mol %: Y2O3) | 3.5 | 4.8 | — | — |
|  | Yttrium content of n-1 layer (mol %: Y2O3) | 3.3 | 4.1 | 4.8 | — |
|  | Yttrium content of n layer (mol %: Y2O3) | 3.0 | 3.5 | 3.5 | 3.0 |
|  | Alumina content of first layer (wt %) | 0.05 | 0.05 | 0.05 | 0.05 |
|  | Alumina content of n-3 layer (wt %) | 0.10 | 0.14 | — | — |
|  | Alumina content of n-2 layer (wt %) | 0.15 | 0.23 | — | — |
|  | Alumina content of n-1 layer (wt %) | 0.20 | 0.31 | 0.15 | — |
|  | Alumina content of n layer (wt %) | 0.25 | 0.40 | 0.25 | 0.25 |
|  | Yttria concentration of layer LA-Yttria concentration of layer LB | 1.0 | 2.5 | 2.5 | 3.5 |
|  | Alumina concentration of layer LA-Alumina concentration of layer LB | −0.20 | −0.35 | −0.20 | −0.20 |
| Fully sintered body | Firing temperature (° C.) | 1550 | 1550 | 1550 | 1550 |
|  | Contrast ratio of first layer | 0.75 | 0.67 | 0.67 | 0.67 |
|  | Contrast ratio of n-3 layer | 0.78 | 0.74 | — | — |
|  | Contrast ratio of n-2 layer | 0.80 | 0.79 | — | — |
|  | Contrast ratio of n-1 layer | 0.83 | 0.84 | 0.78 | — |
|  | Contrast ratio of n-th layer | 0.86 | 0.87 | 0.82 | 0.82 |

TABLE 4-continued

| | | | | |
|---|---|---|---|---|
| Contrast ratio A/Contrast ratio B | 0.87 | 0.77 | 0.82 | 0.82 |
| Number of the intermediate layer | 3 | 3 | 1 | 0 |
| Aesthetic property | C | B | C | C |

It was confirmed that because Examples 1 to 13 satisfied $$\text{Yttria concentration of layer } LA - \text{Yttria concentration of layer } LB > 1.0 \text{ mol \%} \quad \text{Formula (1):}$$

$$0.0 \text{ wt. \%} < \text{Alumina concentration of layer } LB - \text{Alumina concentration of layer } LA < 0.3 \text{ wt. \%} \quad \text{Formula (2):}$$

$$0.71 \leq (\text{Contrast ratio } CA)/(\text{Contrast ratio } CB) \leq 0.86 \quad \text{Formula (3):}$$

these Examples had an appearance similar to a natural tooth and can be applied to cases where high aesthetic property is required It was confirmed that because "Alumina concentration of layer LB–Alumina concentration of layer LA" was 0 wt %, "(Contrast ratio CA)/(Contrast ratio CB)" was large, and therefore Comparative Example 1 was not suitable for cases where high aesthetic property is required.

It was confirmed that because "(Contrast ratio CA)/(Contrast ratio CB)" was too small, Comparative Example 2 was not suitable for cases where high aesthetic property is required.

It was confirmed that because "Yttria concentration of layer LA–Yttria concentration of layer LB" was 1.0 mol %, "(Contrast ratio CA)/(Contrast ratio CB)" was large, and therefore Comparative Example 3 was not suitable for cases where high aesthetic property is required.

It was confirmed that because "Alumina concentration of layer A–Alumina concentration of layer B" was −3.5 wt %, "(Contrast ratio CA)/(Contrast ratio CB)" is small, and therefore Comparative Example 4 was not suitable for cases where high aesthetic property is required.

It was confirmed that because the number of the intermediate layer was less than 2, the changes of translucency and color tone in the crown change were rapid, and therefore Comparative Example 5 was not suitable for cases where high aesthetic property is required.

With respect to the use of substantially any plural and/or singular terms herein, those having skill in the art can translate from the plural to the singular and/or from the singular to the plural as is appropriate to the context.

Although the description herein has been given with reference to the embodiments, it should be noted that those skilled in the art may make various changes and modifications on the basis of this disclosure without difficulty. Accordingly, any such changes and modifications are intended to be included in the scope of the embodiments.

INDUSTRIAL APPLICABILITY

The present disclosure relates to a zirconia mill blank for dental cutting and machining which may impart reproducibility of color tone similar to a natural tooth and high strength to a zirconia perfect sintered body, and therefore is a technique which can be used in the dental field.

What is claimed is:

1. A zirconia mill blank for dental cutting and machining containing yttria and alumina, wherein
between two planes which are parallel and face each other in the zirconia mill blank for dental cutting and machining, a section in which a distance from one plane of the two planes is within 40% of the distance between the two planes is defined as section A, and a section in which a distance from the other plane is within 40% of the distance between the two planes is defined as section B, layer LA contained in the section A and layer LB contained in the section B satisfy the following Formula (1) and Formula (2),
wherein a sintered body prepared by sintering at 1550° C. a test specimen cut out from the layer LA is defined as sintered body SA, a sintered body prepared by sintering at 1550° C. a test specimen cut out from the layer LB is defined as a sintered body SB, a contrast ratio of the sintered body SA at a sample having a thickness of 1 mm is defined as contrast ratio CA and a contrast ratio of the sintered body SB at a sample having a thickness of 1 mm is defined as contrast ratio CB, the contrast ratio CA and the contrast ratio CB satisfy the following Formula (3),
the zirconia mill blank for dental cutting and machining comprises at least two intermediate layers between the layer LA and the layer LB, and
change directions of yttria concentration, alumina concentration and contrast ratio in a stacking direction are not changed by the at least two intermediate layers, $$\text{Yttria concentration of layer } LA - \text{Yttria concentration of layer } LB > 1.0 \text{ mol \%} \quad \text{Formula (1):}$$

$$0.0 \text{ wt. \%} < \text{Alumina concentration of layer } LB - \text{Alumina concentration of layer } LA < 0.3 \text{ wt. \%} \quad \text{Formula (2):}$$

$$0.71 \leq (\text{Contrast ratio } CA)/(\text{Contrast ratio } CB) \leq 0.86, \quad \text{Formula (3):}$$

wherein the contrast ratio CA is 0.70 or less and/or the contrast ratio CB is 0.74 or more.

2. The zirconia mill blank for dental cutting and machining according to claim 1, wherein
all layers contain 3 mol % to 7 mol % of yttria as a stabilizer.

3. The zirconia mill blank for dental cutting and machining according to claim 2, wherein
both end faces in the stacking direction are composed of parallel planes, and
the both end faces compose the two planes which are parallel and face each other.

4. The zirconia mill blank for dental cutting and machining according to claim 3, wherein
the layer LA and the layer LB are parallel to the two planes which are parallel and face each other.

5. The zirconia mill blank for dental cutting and machining according to claim 1, wherein
both end faces in the stacking direction are composed of parallel planes, and
the both end faces compose the two planes which are parallel and face each other.

6. The zirconia mill blank for dental cutting and machining according to claim 5, wherein
the layer LA and the layer LB are parallel to the two planes which are parallel and face each other.

* * * * *